United States Patent
Kulzer

(10) Patent No.: US 10,393,165 B2
(45) Date of Patent: Aug. 27, 2019

(54) METHOD FOR PRODUCING AN ADHESIVE SCREW CONNECTION USING A FLOW DRILL SCREW, AND FLOW DRILL SCREW USABLE THEREFOR

(71) Applicant: Bayerische Motoren Werke Aktiengesellschaft, Munich (DE)

(72) Inventor: Norbert Kulzer, Wallersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 352 days.

(21) Appl. No.: 15/242,665

(22) Filed: Aug. 22, 2016

(65) Prior Publication Data
US 2017/0045074 A1    Feb. 16, 2017

Related U.S. Application Data

(63) Continuation of application No. PCT/EP2015/052271, filed on Feb. 4, 2015.

(30) Foreign Application Priority Data

Feb. 24, 2014  (DE) ......................... 10 2014 203 274

(51) Int. Cl.
*F16B 25/10* (2006.01)
*F16B 25/00* (2006.01)
(Continued)

(52) U.S. Cl.
CPC ............ *F16B 25/0021* (2013.01); *B32B 5/06* (2013.01); *B32B 15/20* (2013.01); *B32B 27/00* (2013.01);
(Continued)

(58) Field of Classification Search
CPC ........ F16B 11/006; F16B 41/002; B32B 5/06; B32B 15/20; B32B 27/00; B32B 37/12; B32B 37/182
See application file for complete search history.

(56) References Cited

U.S. PATENT DOCUMENTS 3,298,725 A * 1/1967 Boteler ..................... B61F 5/26
403/282
3,584,531 A * 6/1971 Greenleaf ............ F16B 43/001
411/369
(Continued)

FOREIGN PATENT DOCUMENTS

| CN | 101501351 A | 8/2009 |
| CN | 201730920 U | 2/2011 |

(Continued)

OTHER PUBLICATIONS

International Search Report (PCT/ISA/210) issued in PCT Application No. PCT/EP2015/052271 dated Jun. 17, 2015, with English translation (six (6) pages).

(Continued)

*Primary Examiner* — Jeffry H Aftergut
*Assistant Examiner* — Jaeyun Lee
(74) *Attorney, Agent, or Firm* — Crowell & Moring LLP

(57) ABSTRACT

A method for producing an adhesive screw connection between at least one upper component and at least one lower component using a flow drill screw, and a corresponding flow drill screw are provided. In the method an adhesive is applied to at least one of the upper and lower components, the flow drill screw penetrates the upper component at the joining point through a pre-drilled hole, and the flow drill screw is screwed into the lower component to form a flow-drilled hole and to join the upper and lower components. A protective ring through which a screw shank of the flow drill screw passes during the screwing-in operation is located in the pre-drilled hole. The protective ring may be capitvely held on the screw shank of the flow drill screw.

7 Claims, 2 Drawing Sheets

(51) Int. Cl.
*F16B 41/00* (2006.01)
*B32B 5/06* (2006.01)
*B32B 15/20* (2006.01)
*B32B 27/00* (2006.01)
*B32B 37/12* (2006.01)
*B32B 37/18* (2006.01)
*F16B 11/00* (2006.01)
*B32B 38/00* (2006.01)

(52) U.S. Cl.
CPC ............ *B32B 37/12* (2013.01); *B32B 37/182* (2013.01); *F16B 11/006* (2013.01); *F16B 41/002* (2013.01); *B32B 38/0012* (2013.01); *B32B 2262/101* (2013.01); *B32B 2262/106* (2013.01); *B32B 2305/08* (2013.01); *B32B 2311/24* (2013.01)

(56) References Cited

U.S. PATENT DOCUMENTS

| | | | |
|---|---|---|---|
| 4,115,912 | A | 9/1978 | Beck |
| 5,094,579 | A | 3/1992 | Johnson |
| 6,419,192 | B1 | 7/2002 | Riecke |
| 2009/0123691 | A1 | 5/2009 | Vollet et al. |
| 2009/0311074 | A1 | 12/2009 | Friederich et al. |
| 2012/0213611 | A1 | 8/2012 | Travis |

FOREIGN PATENT DOCUMENTS

| | | | | |
|---|---|---|---|---|
| DE | 39 09 725 | C1 | 9/1990 | |
| DE | 298 01 813 | U1 | 3/1998 | |
| DE | 19800035 | A1 * | 7/1999 | ........... B29C 65/601 |
| DE | 103 48 427 | A1 | 5/2005 | |
| DE | 10 2004 025 492 | A1 | 8/2009 | |
| DE | 10 2011 120 670 | A1 | 7/2012 | |
| DE | 10 2012 210 791 | A1 | 1/2014 | |
| EP | 2 423 518 | A2 | 2/2012 | |
| WO | WO 98/23873 | | 6/1998 | |

OTHER PUBLICATIONS

German Search Report issued in German Application No. 10 2014 203 274.1 dated Nov. 14, 2014, with partial English translation (eleven (11) pages).

Chinese Office Action issued in counterpart Chinese Application No. 201580002911.0 dated Dec. 27, 2016 with English translation (nine pages).

* cited by examiner

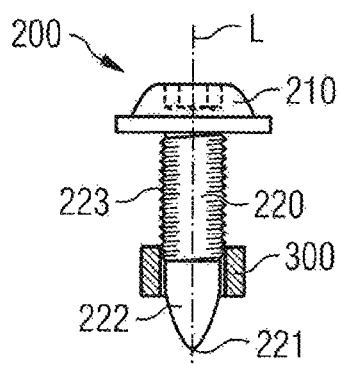
FIG 1A
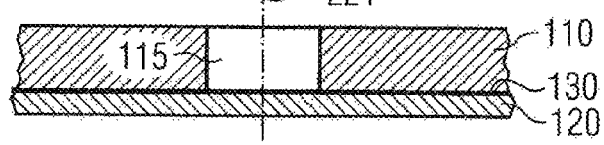
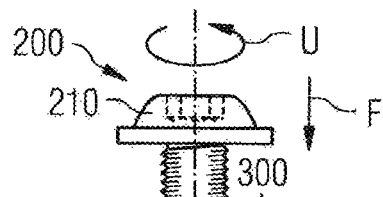
FIG 1B
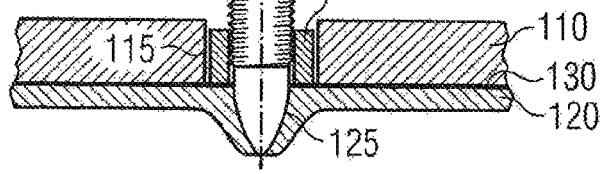
FIG 1C
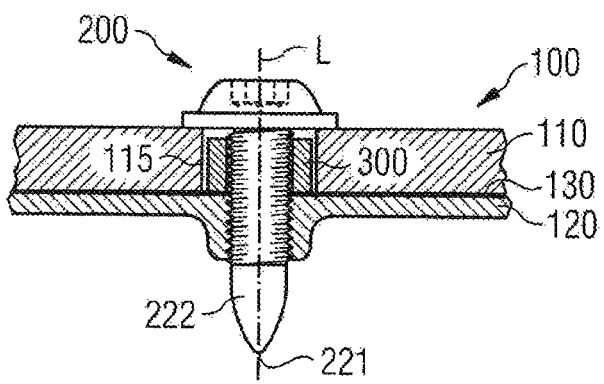

METHOD FOR PRODUCING AN ADHESIVE SCREW CONNECTION USING A FLOW DRILL SCREW, AND FLOW DRILL SCREW USABLE THEREFOR

CROSS REFERENCE TO RELATED APPLICATIONS

This application is a continuation of PCT International Application No. PCT/EP2015/052271, filed Feb. 4, 2015, which claims priority under 35 U.S.C. § 119 from German Patent Application No. 10 2014 203 274.1, filed Feb. 24, 2014, the entire disclosures of which are herein expressly incorporated by reference.

BACKGROUND AND SUMMARY OF THE INVENTION

The invention relates to a method for producing an adhesive screw connection between at least one upper component and at least one lower component using a flow drill screw.

The invention also relates to a flow drill screw usable therefor.

Producing an adhesive screw connection between components by adhesive bonding and flow drill screwing is sufficiently well known from the prior art. In this respect, reference is made for example to German patent document no. DE 103 48 427 A1. The operation of chipless flow drill screwing and thread forming and also a suitable hole- and thread-forming or flow-drilling screw are graphically represented in German patent document no. DE 39 09 725 C1.

In particular when the upper component has a material thickness and/or hardness that is unsuitable for flow drill screwing or is formed from a material that is unsuitable for flow drill screwing (for example FRP), the upper component may have a predrilled hole, as shown in German patent document no. DE 10 2012 210 791 A1. During the screwing-in operation, the screw tip and then the self-forming thread portion of the flow drill screw meets the previously applied layer of adhesive, whereby the adhesive is swirled up and thrown out of the predrilled hole. This leads to contamination of the screwing-in device and/or the components. Furthermore, the adhesive escaping from the predrilled hole may impair the torque control of the screwing-in device. Until now, the joining or screwing-in location has therefore been omitted from an application of adhesive. However, the adhesive-free portion makes the application of adhesive more complicated and leads to an interrupted adhesive seam or adhesive area.

The invention is based on the object of providing a method for producing an adhesive screw connection between at least one predrilled upper component and at least one lower component using a flow drill screw that does not have at least one disadvantage that the prior art entails, or only at least to a reduced extent.

This object is achieved by the method according to the invention for producing an adhesive screw connection between at least one predrilled upper component and at least one lower component using a flow drill screw, wherein the screw penetrates the upper component at the joining location through a predrilled hole and is screwed to the lower component to form a flow-drilled hole, and there is provided at least one protective ring or a protective sleeve, through which the screw shank is screwed during the screwing-in operation in the predrilled hole of the upper component.

The method according to the invention is preferably performed in an automated manner. A number of upper, predrilled components and/or a number of lower components may be provided. The components are adhesively bonded to one another at their mutually facing surfaces. The adhesive may be applied over the surface area or along at least one path (for producing an adhesive seam).

A flow drill screw, i.e. a screw that is suitable for chipless flow drill screwing and thread forming, has a screw shank with a hole-forming portion, extending from the tip of the shank or screw, and a self-forming thread portion, adjoining in the direction of the screw head.

The protective ring has a shorter axial length than the screw shank and can move in the axial direction in relation to the screw shank (i.e. an axial mobility is provided between the protective ring and the screw shank of the flow drill screw). The protective ring preferably is formed with a smaller outside diameter in comparison with the diameter of the predrilled hole in the upper component, so that it can be introduced or inserted into the predrilled hole without pressing. After the screwing-in operation, the protective ring remains in the predrilled hole.

During the screwing in, the protective ring is supported within the predrilled hole in the upper component against the lower component, whereby the axial relative movement between the screw shank and the protective ring is made possible in such a way that the fixed protective ring and the screw head of the screwing-in screw approach one another during the screwing-in operation. The screwing-in operation has two phases (flow drill screwing and thread forming with simultaneous thread engagement).

The protective ring serves on the one hand for preventing adhesive from escaping during the screwing-in operation. In particular, the adhesive is prevented from being drawn up by the self-forming thread of the screw. The components and the screwing-in device (including the clamping tools used) are consequently not contaminated by escaping adhesive. The application of adhesive may take place continuously or over the full surface area, whereby the application, in particular automated application, is facilitated and advantages are also obtained with regard to the achieved strength of the connection and the corrosion behavior at the joining location. Furthermore, the torque control, if provided, remains stable. On the other hand, however, the protective ring may also serve for the centering and guiding of the screw shank within the predrilled hole during the screwing-in operation and prevent contact between the rotating screw shank and the inner wall of the predrilled hole (that is to say so-called seizing between the screw shank and the wall of the predrilled hole is prevented). Furthermore, improved corrosion resistance can be achieved by the protective ring remaining in the predrilled hole. In particular, contact corrosion (for example due to exposed CRP fibers of the upper component) can be avoided. This is not an exhaustive list of advantages that accompany the invention.

The protective ring may be fastened to the screw shank and inserted together with it into the predrilled hole in the upper component. This leads to a simplification of the method sequence and to better automatability.

Preferably, the axial length of the protective ring corresponds at most to the thickness of the upper component. In other words, the axial length of the protective ring does not exceed the thickness of the upper component. As a result, the protective ring has sufficient space in the predrilled hole in the axial direction, whereby the screwing-in operation is also not impaired.

Similarly, it may be provided that the protective ring is deformable and formed with an excess length in the axial direction in comparison with the thickness of the upper component, whereby it is compressed between the lower component and the screw head during the screwing-in operation. When being compressed, the protective ring is deformed, in particular plastically, for which purpose it is formed from a deformable material, such as for example plastic (including plastic composite materials) or metal (for example a soft aluminum material). The wall of the ring may have structural weakening features, which make selective and/or facilitated compression possible, and with it improved flowing of the material of the ring. Such weakening features may be for example impressions or slits in the wall of the ring. The compression allows bearing pressure of the projected area within the predrilled hole in the upper component to be brought about, with the effect of preventing slipping of the components at the joining location, in particular until the curing of the adhesive. Furthermore, the compressing of the ring allows the sealing off of the predrilled hole to be improved, thereby also reliably preventing outgassing, for example in the cathodic electrophoretic painting process (with the risk of blistering).

It may similarly be provided that the protective ring is stiff and formed with an excess length in the axial direction in comparison with the thickness of the upper component, whereby a defined gap occurs or is produced between the components during the screwing-in operation. This defined gap serves for example as an adhesive gap. As a result, displacement of adhesive and/or direct contact of the components at the joining or screwing location can be prevented. The stiff protective ring is for example formed from metal, in particular from a steel material or hard aluminum material.

On account of the pressing achieved at the joining or screwing-in location, during the screwing in of the flow drill screw the adhesive can penetrate into the predrilled hole, as it were from below, and fill cavities and/or adhesively bond the protective ring within the predrilled hole. As a result, on the one hand the sealing off is improved and on the other hand the achievable strength of the connection is increased. The adhesive applied continuously or over the full surface area for the adhesive bonding of the components may therefore also serve within the scope of the invention for achieving a functional use within the predrilled hole. As already explained at the beginning, by contrast it is provided in the prior art that the joining or screwing-in location is omitted from an application of adhesive. It is provided with preference that, during the application of the adhesive, more adhesive is applied altogether or only locally at the screwing-in or joining location, and then, during the screwing in of the flow drill screw, the adhesive can penetrate into the predrilled hole from below.

A flow drill screw according to the invention has a screw head and a screw shank formed on the latter, with a hole-forming portion extending from the tip of the shank and a self-forming thread portion adjoining in the direction of the screw head. A captively held protective ring is arranged on the screw shank. The flow drill screw and the protective ring are accordingly formed in a one-part manner, i.e. as one part.

The protective ring preferably is arranged in the transitional region between the hole-forming portion and the self-forming thread portion on the screw shank and is securely held on the screw shank, in particular by clamping or by a clamping fit and/or by a form fit (for example with the thread turns of the thread portion). Depending on the strength of the clamping fit and/or the form fit, the screw shank may slide through the protective ring in the axial direction or be screwed through the protective ring by the self-forming thread portion. In both cases, an axial relative movement between the flow drill screw or its screw shank and the protective ring, which in the process is supported on the lower component, is obtained during the screwing-in operation.

The protective ring may be formed from metal (for example aluminum) or from plastic (for example PA 4.6). The protective ring may be fitted or screwed onto the screw shank. Furthermore, a releasable fixing, for example by spot adhesive bonding, is also possible. In particular if it is formed from plastic, the protective ring may also be molded onto the screw shank.

With preference, the protective ring fastened or held on the screw shank at least partially covers over the hole-forming portion and in particular also the screw tip. As a result, the protective ring, formed in particular in the manner of a sleeve, may also act as a guard during transport and storage.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1A-1C show in three sectional representations a screwing-in operation according to the invention.

DETAILED DESCRIPTION OF THE DRAWINGS

Figure 2:
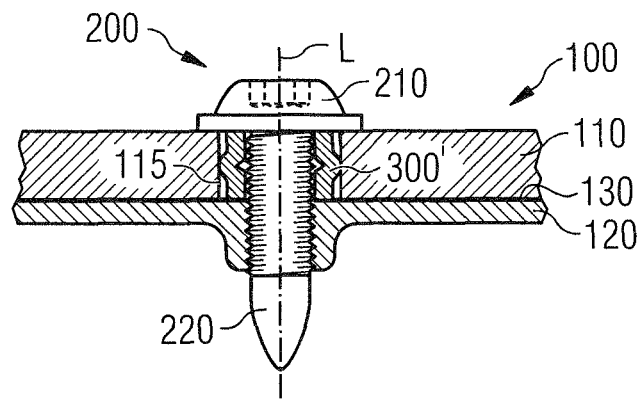
FIG. 2 shows in a sectional representation another embodiment of an adhesive screw connection produced according to an embodiment of the invention.

FIG. 1A shows in the form of a detail two sheet-like components 110 and 120, which are to be adhesively bonded at the joining location represented and joined with the aid of a flow drill screw 200. The upper component 110 has at the joining location a predrilled hole 115. The upper component 110 may be formed from metal, for example a sheet or cast material, or else from a fiber reinforced plastic (FRP), such as in particular glass fiber reinforced plastic (GRP) or carbon fiber reinforced plastic (CRP). The lower component 120 is formed from a material suitable for flow drill screwing, such as in particular a steel or aluminum sheet. Between the components 110 and 120 there is a continuous adhesive film or an intermediate adhesive layer 130.

The flow drill screw 200 has a screw head 210 and a screw shank 220 formed on the latter and extending in the axial direction L (screw axis). The screw shank 220 is formed with a hole-forming portion 222, extending from the blunt or rounded shank or screw tip 221, and a self-forming thread portion 223, adjoining in the direction of the screw head 210. The self-forming thread portion 223 may, as shown, extend up to the screw head 210. Similarly, the shank portion near the head, or adjacent the screw head 210, may be formed without a thread or in a threadless manner. The flow drill screw 200 is known as such from the prior art.

Arranged on the screw shank 220, in the transitional region between the hole-forming portion 222 and the self-forming thread portion 223, is a protective ring 300, which is referred to as such and is securely held captively on the screw shank 220 by clamping (for which purpose the inside diameter of the protective ring 300 is smaller than the outside diameter of the screw shank 220 at the location concerned) or a form fit (for example by slight thread engagement). The protective ring 300 has in the embodiment shown a sleeve-like shape and to this extent may also be referred to as a protective sleeve. As a departure from the rectangular cross section shown, the protective ring 300 may also be formed with other cross-sectional geometries and for example have a cross section that is circular, oval, triangular or the like.

The screwing in of the flow drill screw 200 takes place (without predrilling of the lower component 120) in a way that is known per se from the prior art. At the beginning of the screwing-in operation, the screw shank 220 is inserted together with the protective ring 300 held on it into the predrilled hole 115 in the upper component 110, so that the screw tip 221 comes to bear against the lower component 120. The screw 200 is then subjected to a number of revolutions U and pressed with a force F against the lower component 120, whereby there forms in a known way in the lower component 120 a flow-drilled hole 125, into which the self-forming thread portion 223 of the screw 200 is screwed. This is shown in FIG. 1B. (The screwing-in device is not represented.)

During the screwing-in operation, performed in particular in an automated manner, the axial compressive force F and/or the number of revolutions U may be varied and in particular controlled. A reversal of the direction of rotation may also be provided. Furthermore, a holding-down clamp or the like may be used for applying a fixing force to the upper component 110.

The protective ring 300 located in the predrilled hole 115 is pressed against the lower component 120 by the screw 200 that is driven into the components 110 and 120 in the direction of the force F, and in the process is supported on the lower component 120. At the same time, the protective ring 300 is screwed through by the screw shank 220, whereby there is an axial relative movement between the screw shank 220 and the fixed protective ring 300, in which the protective ring 300 and the screw head 210 approach one another. The relative movement between the protective ring 300 and the screw shank 220 of the flow drill screw 200 takes place in particular in such a way that the thread of the thread portion 223 does not engage in the inner wall of the ring, but instead the screw shank 220 is pushed through the protective ring 300, and in particular slides through.

The protective ring 300 prevents adhesive from rising up during the screwing-in operation out of the continuous adhesive layer 130 through the predrilled hole 115 and/or along the thread portion 223 of the screw 200, in that the adhesive remains as it were hanging on the protective ring 300. As a result, contamination of the components, in particular the upper component 110, and/or of the screwing-in device is prevented. On the other hand, it may be provided that, on account of the pressing achieved at the joining or screwing-in location, the adhesive 130 penetrates specifically into the predrilled hole 115 during the screwing-in operation, but without escaping from the predrilled hole 115 (in other words the adhesive remains in the predrilled hole 115), in order for example to fill voids in the predrilled hole 115 and/or adhesively bond the protective ring 300 within the predrilled hole 115. During the screwing in of the screw 200, the protective ring 300 may also serve as a centering aid within the predrilled hole 115 in the upper component 110, the inner wall of the predrilled hole 115 also being protected from damage by the rotating screw shank 220 or the thread 223 formed on it.

FIG. 1C shows the final state. The combination of components produced is denoted by 100. The protective ring 300 remains permanently in the predrilled hole 115. The axial length of the protective ring 300 lies below the thickness of the upper component 110 and corresponds as a maximum or at most to the thickness of the upper component 110.

In the exemplary embodiments shown in FIGS. 1A-1C, the screw shank 220 of the flow drill screw 200 may have a nominal diameter of 5.0 mm. The predrilled hole 115 in the upper component 110 may have a diameter of 7.0 mm to 8.0 mm. The protective ring 300 may have an outside diameter of 6.0 mm to 7.9 mm, from which a preferred uniform wall thickness of about 0.5 mm to about 1.5 mm is obtained for the wall of the protective ring 300.

FIG. 2 shows another embodiment, in which the deformable protective ring 300' is formed with an axial excess length in comparison with the thickness of the upper component 110, whereby it is compressed between the lower component 120 and the screw head 210 during the screwing-in operation, so that an indirect form fit is brought about between the screw shank 220 and the predrilled hole 115 in the upper component 110, as represented. As a result, shearing loads between the components 110 and 120, in particular before the curing of the adhesive 130, can be withstood better. The protective ring 300' is formed from a deformable material, such as for example plastic, a plastic composite or metal (in particular aluminum). If appropriate, the material of the protective ring 300' may also penetrate between the components 110 and 120 and form a gap (see FIG. 4). The screwing-in operation takes place in a way analogous to the previous explanations with respect to FIGS. 1A-1C.

Figure 3:
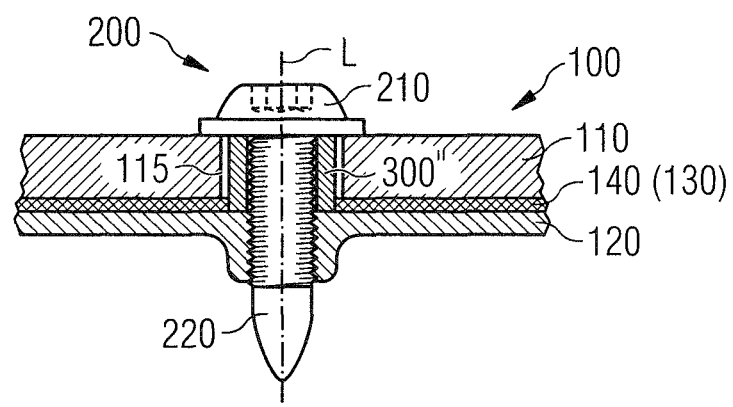
FIG. 3 shows in a sectional representation a further embodiment of an adhesive screw connection produced according to the invention.

FIG. 3 shows a further embodiment, in which the protective ring 300" is stiff or undeformable and formed with an axial excess length in comparison with the thickness of the upper component 110, whereby a defined gap 140 is produced between the components 110 and 120 during the screwing-in operation. In the gap 140 there may be for example adhesive 130. The non-compressible protective ring 300" prevents physical contact between the components 110 and 120 and stops the adhesive 130 from being pressed away at the joining location. The screwing-in operation takes place in a way analogous to the previous explanations with respect to FIGS. 1A-1C.

Figure 4:
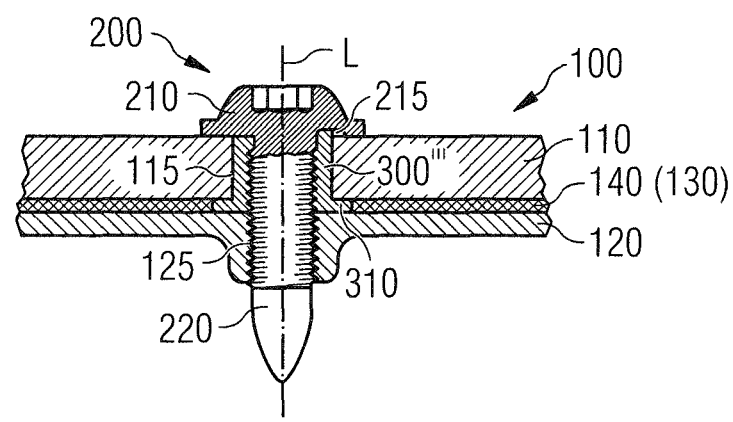
FIG. 4 shows in a sectional representation a further embodiment of an adhesive screw connection produced according to the invention.

FIG. 4 shows a further embodiment, in which the protective ring 300''' has at its end facing away from the screw head 210 a flow bead 310, which is brought about by plastic deformation and has pressed the components 110 and 120 apart at the screwing-in location, whereby, by analogy with the possibility for an embodiment that is shown in FIG. 3, between the components 110 and 120 there has formed a gap 140, which with preference is filled with adhesive 130.

The screwing-in operation takes place substantially by analogy with the previous explanations with respect to FIGS. 1A-1C. During the screwing-in operation, the sleeve-like protective ring 300''', formed with an axial excess length in comparison with the thickness of the upper component 110, is compressed, as explained in conjunction with the exemplary embodiment of FIG. 2. Furthermore, the lower component 120 is pressed downward, or pressed away from the upper component 110, by the flow drill screw 200, so as to form between the components 110 and 120 the gap 140, into which the material of the ring can flow, which is conducive to keeping a distance between the components 110 and 120, the flow bead 310 that is forming then also acting as a spacer. For this purpose, the protective ring 300''' may have at its end facing away from the screw head 210 or facing toward the lower component 120 special design features (for example softer material, a smaller wall thickness of the ring, impressions or slits in the wall of the ring and/or the like).

The protective ring 300''' preferably is formed from a deformable material. Furthermore, it may be provided that the protective ring 300''', formed in the manner of a sleeve, is formed as substantially stiff, in other words undeformable, as explained in conjunction with the exemplary embodiment of FIG. 3, and is only deformable at its end facing away from the screw head 210.

Also represented in FIG. 4 are two preferred designs of the screw head 210, to be specific with an underhead groove 215 (right side of the screw head), for receiving material of the ring to avoid an underhead gap, and without an underhead groove (left side of the screw head).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF DESIGNATIONS 100 combination of components
110 upper component
115 predrilled hole
120 lower component
125 flow-drilled hole
130 adhesive, adhesive layer
140 gap
200 flow drill screw
210 screw head
215 underhead groove
220 screw shank
221 screw tip
222 flow-drill-screwing portion, hole-forming portion
223 self-forming thread portion
300 protective ring
310 flow bead
F axial compressive force
L longitudinal axis, screw axis
U number of revolutions

What is claimed is:

1. A method for producing an adhesive screw connection between an upper component and a lower component, comprising the acts of:
    applying an adhesive to at least one of the upper component and the lower component;
    inserting a flow drill screw through a hole in the upper component into contact with the lower component; and
    screwing the flow drill screw into the lower component to form a flow-drilled hole;
    wherein
        an underside surface of a head of the flow drill screw is flat, and
        in the act of screwing the flow drill screw into the lower component a screw shank of the flow drill screw passes through a flangeless protective ring located in the hole, the protective ring being configured such that after screwing in the flow drill screw no portion of the protective ring is above an outer surface of the upper component when the flow drill screw is in an installed position.

2. The method as claimed in claim 1, wherein
    in the inserting act the protective ring is inserted together with the flow drill screw into the hole in the upper component.

3. The method as claimed in claim 2, wherein
    the protective ring is held on the screw shank of the flow drill screw during the inserting act.

4. The method as claimed in claim 1, wherein
    an axial length of the protective ring is less than or equal to a thickness of the upper component.

5. A method for producing an adhesive screw connection between an upper component and a lower component, comprising the acts of:
    applying an adhesive to at least one of the upper component and the lower component;
    inserting a flow drill screw through a hole in the upper component into contact with the lower component; and
    screwing the flow drill screw into the lower component to form a flow-drilled hole;
    wherein
        in the act of screwing the flow drill screw into the lower component a screw shank of the flow drill screw passes through a protective ring located in the hole
        an axial length of the protective ring is greater than a thickness of the upper component, and
        in the screwing act the protecting ring is compressed between the lower component and a screw head of the flow drill screw and deformed.

6. A method for producing an adhesive screw connection between an upper component and a lower component, comprising the acts of:
    applying an adhesive to at least one of the upper component and the lower component;
    inserting a flow drill screw through a hole in the upper component into contact with the lower component; and
    screwing the flow drill screw into the lower component to form a flow-drilled hole;
    wherein
        in the act of screwing the flow drill screw into the lower component a screw shank of the flow drill screw passes through a protective ring located in the hole,
        an axial length of the protective ring is greater than a thickness of the upper component, and
        in the screwing act as the protective ring is compressed between the lower component and a screw head of the flow drill screw such that a predefined gap is created between the upper component and the lower component.

7. The method as claimed in claim 1, further
    in the applying act the adhesive is applied such that a portion of the adhesive penetrates into the hole in the upper component and adhesively bonds the protective ring within the hole.

* * * * *